United States Patent
Kim et al.

(10) Patent No.: US 10,066,130 B2
(45) Date of Patent: Sep. 4, 2018

(54) PRESSURE-SENSITIVE ADHESIVE COMPOSITION

(71) Applicant: LG Chem, Ltd., Seoul (KR)

(72) Inventors: Kee Young Kim, Daejeon (KR); Sung Soo Yoon, Daejeon (KR); Jeong Sik Bae, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/574,651

(22) Filed: Dec. 18, 2014

(65) Prior Publication Data

US 2015/0093533 A1    Apr. 2, 2015

Related U.S. Application Data

(63) Continuation of application No. PCT/KR2014/005442, filed on Jun. 19, 2014.

(30) Foreign Application Priority Data

Jun. 19, 2013  (KR) .................. 10-2013-0070504
Jun. 19, 2013  (KR) .................. 10-2013-0070512

(51) Int. Cl.

| C09J 11/06 | (2006.01) |
|---|---|
| C09J 9/02 | (2006.01) |
| G02B 1/18 | (2015.01) |
| C09J 133/06 | (2006.01) |
| C09J 133/14 | (2006.01) |
| C09J 7/02 | (2006.01) |
| C08K 5/3435 | (2006.01) |
| C09J 133/08 | (2006.01) |
| G02B 1/10 | (2015.01) |
| H04B 1/3888 | (2015.01) |
| G02B 1/14 | (2015.01) |
| G02B 1/16 | (2015.01) |

(52) U.S. Cl.
CPC ............... *C09J 9/02* (2013.01); *C08K 5/3435* (2013.01); *C09J 7/0217* (2013.01); *C09J 11/06* (2013.01); *C09J 133/066* (2013.01); *C09J 133/08* (2013.01); *C09J 133/14* (2013.01); *G02B 1/105* (2013.01); *G02B 1/14* (2015.01); *G02B 1/16* (2015.01); *G02B 1/18* (2015.01); *H04B 1/3888* (2013.01); *C09J 2201/122* (2013.01); *C09J 2201/128* (2013.01); *C09J 2201/606* (2013.01); *C09J 2203/318* (2013.01); *C09J 2433/00* (2013.01); *G02F 2202/28* (2013.01); *Y10T 428/1462* (2015.01); *Y10T 428/2848* (2015.01); *Y10T 428/2887* (2015.01); *Y10T 428/2891* (2015.01); *Y10T 428/31935* (2015.04); *Y10T 428/31938* (2015.04)

(58) Field of Classification Search
None
See application file for complete search history.

(56) References Cited

U.S. PATENT DOCUMENTS

| 5,322,861 | A | 6/1994 | Tsuge et al. |
|---|---|---|---|
| 6,441,092 | B1 | 8/2002 | Gieselman |
| 7,887,914 | B2 | 2/2011 | Kobayashi et al. |
| 2002/0085284 | A1* | 7/2002 | Nakamura ............... G02B 1/11 359/601 |
| 2003/0124346 | A1* | 7/2003 | Yamanaka ............. C09J 7/0217 428/355 AC |
| 2005/0244633 | A1 | 11/2005 | Kobayashi et al. |
| 2006/0024494 | A1 | 2/2006 | Amano et al. |
| 2006/0057368 | A1 | 3/2006 | Kobayashi et al. |
| 2006/0207722 | A1* | 9/2006 | Amano .................. C09J 7/0217 156/327 |
| 2007/0238805 | A1 | 10/2007 | Maeda et al. |
| 2008/0311395 | A1 | 12/2008 | Ukei et al. |
| 2009/0065140 | A1 | 3/2009 | Osoegawa |
| 2009/0104445 | A1 | 4/2009 | Inoue et al. |
| 2009/0163626 | A1* | 6/2009 | Ukei ....................... B32B 27/06 524/99 |

(Continued)

FOREIGN PATENT DOCUMENTS

| CN | 1693401 A | 11/2005 |
|---|---|---|
| CN | 1749344 A | 3/2006 |

(Continued)

OTHER PUBLICATIONS

Product data sheet "Tinuvin 765" from BASF, Jul. 2011.*
Product data sheet "4-Hydroxybutyl acrylate" from Sigma-Aldrich, retrived Dec. 21, 2015.*
Product data sheet "2-Hydroxyethyl acrylate" from Sigma-Aldrich, retrived Dec. 21, 2015.*
Nishitsuji, Nama et al., "Pressure-Sensitive Adhesive Composition for Use in Surface Protecting Sheet, and Surface Protecting Sheet Using the Same", machine translation of JP 2008-248223A, Oct. 16, 2008.*
Kazuhiro, Sakaguchi et al., "Pressure Sensitiv Adhesive Composition for Surface Protective Film", English translation of JP 2008-280375A, published on Nov. 20, 2008.*

(Continued)

*Primary Examiner* — Anish P Desai
(74) *Attorney, Agent, or Firm* — Lerner, David, Littenberg, Krumholz & Mentlik, LLP

(57) ABSTRACT

A pressure-sensitive adhesive composition, a protective film, an optical element and a display device are provided. The pressure-sensitive adhesive composition has excellent storage stability, exhibits proper low-speed and high-speed peel strengths after formation of a cross-linked structure, and also has an excellent balance between the low-speed and high-speed peel strengths. Therefore, when the pressure-sensitive adhesive composition is applied to a protective film, the pressure-sensitive adhesive composition can have an excellent protective effect, and can also be advantageous to perform a high-speed process since the pressure-sensitive adhesive composition is easily peeled during a high-speed peeling process. In the high-speed peeling process, the pressure-sensitive adhesive composition can exhibit excellent antistatic characteristics.

15 Claims, No Drawings

(56) References Cited

U.S. PATENT DOCUMENTS

| | | | | |
|---|---|---|---|---|
| 2009/0275705 | A1* | 11/2009 | Fujita | C08F 293/00 525/342 |
| 2009/0317635 | A1* | 12/2009 | Amano | C09J 7/0217 428/355 AC |
| 2010/0238384 | A1* | 9/2010 | Tochigi | G02B 5/0226 349/96 |
| 2011/0007244 | A1* | 1/2011 | Kim | C08G 18/6229 349/96 |
| 2011/0187970 | A1* | 8/2011 | Kim | C08F 220/18 349/96 |
| 2012/0320317 | A1* | 12/2012 | Yoon | G02B 5/305 349/96 |
| 2012/0328800 | A1 | 12/2012 | Yoon et al. | |
| 2013/0029146 | A1 | 1/2013 | Takashima et al. | |
| 2013/0085215 | A1* | 4/2013 | Shitara | C09J 7/0217 524/100 |
| 2013/0211028 | A1* | 8/2013 | Shinike | G06F 3/044 526/307.5 |
| 2013/0224436 | A1 | 8/2013 | Kim et al. | |
| 2014/0016067 | A1 | 1/2014 | Yoon et al. | |
| 2014/0016069 | A1* | 1/2014 | Kim | C09J 133/04 349/96 |
| 2014/0178608 | A1 | 6/2014 | Yoon et al. | |
| 2014/0220264 | A1* | 8/2014 | Park | C09J 133/14 428/1.55 |
| 2015/0093569 | A1* | 4/2015 | Chi | G02B 1/10 428/354 |
| 2015/0099114 | A1* | 4/2015 | Kim | G02B 1/14 428/355 CN |
| 2016/0376480 | A1* | 12/2016 | Bae | C09D 133/066 428/41.7 |
| 2017/0260423 | A1* | 9/2017 | Son | C09J 4/06 |

FOREIGN PATENT DOCUMENTS

| | | | |
|---|---|---|---|
| CN | 101910346 A | 12/2010 | |
| CN | 102096139 A | 6/2011 | |
| CN | 102482550 A | 5/2012 | |
| CN | 102516902 A | 6/2012 | |
| CN | 102746811 A | 10/2012 | |
| CN | 103003379 A | 3/2013 | |
| CN | 103820059 A | 5/2014 | |
| EP | 1323802 A2 | 7/2003 | |
| EP | 1621596 A2 | 2/2006 | |
| EP | 2484734 A2 | 8/2012 | |
| EP | 2677015 A2 | 12/2013 | |
| JP | 1993-140519 | 6/1993 | |
| JP | 05140519 A | 6/1993 | |
| JP | H10298491 A | 11/1998 | |
| JP | 2003183612 A | 7/2003 | |
| JP | 2007217441 A | 8/2007 | |
| JP | 2008248223 A | 10/2008 | |
| JP | 2008280375 A | 11/2008 | |
| JP | 2011037929 A | 2/2011 | |
| JP | 2011-225732 A | 11/2011 | |
| JP | WO 2012023567 A1 * | 2/2012 | G06F 3/044 |
| JP | 2012-184434 A | 9/2012 | |
| JP | 2013107978 A | 6/2013 | |
| JP | 2014098128 A | 5/2014 | |
| JP | 2014196377 A | 10/2014 | |
| KR | 20000009647 A | 2/2000 | |
| KR | 20000018983 A | 4/2000 | |
| KR | 20000019116 A | 4/2000 | |
| KR | 20010111362 A | 12/2001 | |
| KR | 20020008267 A | 1/2002 | |
| KR | 20020066505 A | 8/2002 | |
| KR | 20030068335 A | 8/2003 | |
| KR | 20040030919 A | 4/2004 | |
| KR | 20040083916 A | 10/2004 | |
| KR | 20040085484 A | 10/2004 | |
| KR | 20060128659 A | 12/2006 | |
| KR | 20070100170 A | 10/2007 | |
| KR | 20070101001 A | 10/2007 | |
| KR | 20080005722 A | 1/2008 | |
| KR | 20080063107 A | 7/2008 | |
| KR | 20080101801 A | 11/2008 | |
| KR | 20090049557 A | 5/2009 | |
| KR | 20110095004 A | 8/2011 | |
| KR | 20110095464 A | 8/2011 | |
| KR | 20110095820 A | 8/2011 | |
| KR | 20120060782 A | 6/2012 | |
| KR | 2012-0109398 A | 10/2012 | |
| KR | 2012-0109411 A | 10/2012 | |
| KR | 20120110032 A | 10/2012 | |
| KR | 20130013995 A | 2/2013 | |
| KR | 2013-0023183 A | 3/2013 | |
| KR | 20130056169 A | 5/2013 | |
| KR | 20130058761 A | 6/2013 | |
| TW | 200613492 | 5/2006 | |
| TW | 201127926 A | 8/2011 | |
| TW | 201309769 A | 3/2013 | |
| WO | 2007029644 A1 | 3/2007 | |
| WO | 2009091171 A2 | 7/2009 | |
| WO | 2011027707 A1 | 3/2011 | |
| WO | 2012064071 A2 | 5/2012 | |
| WO | 2012128596 A2 | 9/2012 | |

OTHER PUBLICATIONS

Koo, Jae et al., "Anti-Glare Film and Anti-Glare Composition for Preparing the Same", machine translation of KR 2011-0095004A, published on Aug. 24, 2011.*
Office Action from corresponding Taiwan Application No. 103121217, dated Jul. 6, 2015.
Office Action from corresponding Taiwanese Application No. 103121218, dated Jul. 6, 2015.
Office Action from corresponding Chinese Application No. 201480002469.7, dated Nov. 23, 2015.
Extended search report from European Application No. 14813992.6, dated Feb. 23, 2016.
IPO Search Report from Taiwan Application No. 103121220, dated Mar. 16, 2016.
Extended Search Report from European Application No. 14814057.7, dated Apr. 18, 2016.
XP-002756139, Database WPI, Thomson Scientific, London, GB (2013), Week 39.
Extended search report from European Application No. 14813735.9, dated May 19, 2016.
Office Action from Chinese Application No. 201480002449.X dated Oct. 28, 2015.
Office Action from Chinese Application No. 201480002466.3, dated Oct. 30, 2015.
Nana, Nishitsuji et al., "Pressure-Sensitive Adhesive Agent Composition for Surface Protecting Sheet, and Surface Protecting Sheet Using the Same", English Translation of JP2008-248223A, Oct. 16, 2008.
Product data sheet "Triethylene glycol methyl ether methacrylate", Sigma-Aldrich, Jun. 26, 2017.
Product data sheet "(2-Methoxyethyl) acrylate", Sigma-Aldrich, Jun. 29, 2017.

* cited by examiner

PRESSURE-SENSITIVE ADHESIVE COMPOSITION

CROSS-REFERENCE TO RELATED APPLICATIONS

The present application is a continuation of International PCT/KR2014/005442 filed on Jun. 19, 2014, which claims the benefit of Korean Patent Application No. 10-2013-0070504, filed on Jun. 19, 2013 and Korean Patent Application No. 10-2013-0070512, filed on Jun. 19, 2013, the disclosures of which are incorporated herein by reference.

FIELD

The present application relates to a pressure-sensitive adhesive composition, a film for protecting an optical element, an optical element, and a display device.

BACKGROUND

Protective films may be used to prevent filth such as dust from being attached to optical elements such as polarizing plates, other plastic products, home appliances or automobiles, or to prevent occurrence of scratches. The protective films require proper peel strength and antistatic characteristics.

For example, when a protective film is rapidly peeled off for the purpose of use of products or assembly of other products, the protective film has to require relatively low peel strength (hereinafter referred to as "high-speed peel strength"). On the other hand, when the protective film is slowly peeled off, the protective film has to require relatively high peel strength (hereinafter referred to as "low-speed peel strength") so as to exhibit a proper protective function.

Also, foreign substances such as dust may be generally absorbed by static electricity occurring during peeling of the protective film, or devices may be electrostatically damaged or malfunction in the case of electronic products. In particular, the problems regarding the static electricity are being currently issued with the propagation of computers, and the integration of parts by the multifunctionality of liquid crystal TVs or mobile phones.

Therefore, many attempts have been conducted to give an antistatic function to a pressure-sensitive adhesive included in the protective film.

For example, the patent document 1 discloses that an ethylene oxide-modified dioctyl phthalate plasticizer is mixed with a pressure-sensitive adhesive to suppress the occurrence of static electricity. Also, the patent document 2 discloses that an organic salt is added to a pressure-sensitive adhesive, and the patent document 3 discloses that a metal salt and a chelating agent are mixed with a pressure-sensitive adhesive. However, the methods have problems in that contamination may occur by the transfer of the pressure-sensitive adhesive components to products protected by the protective film, it may be difficult to prevent static electricity from occurring at the beginning, and, especially, the low-speed peel strength important for the protective function is extremely low.

PRIOR ART DOCUMENTS

Patent Documents

PATENT DOCUMENT 1: Japanese Unexamined Patent Laid-open Publication No. 1993-140519

PATENT DOCUMENT 2: Korean Unexamined Patent Application Publication No. 2004-0030919

PATENT DOCUMENT 1: Korean Unexamined Patent Application Publication No. 2006-0128659

DESCRIPTION

Object

The present application provides a pressure-sensitive adhesive composition, a film for protecting an optical element, an optical element, and a display device.

Solution

The pressure-sensitive adhesive composition according to one illustrative embodiment of the present application may include a polymer, and a photostabilizer. In the pressure-sensitive adhesive composition, the polymer may be a polymer having a cross-linking point. In this case, the polymer may react with a cross-linking agent, which may be further included in the pressure-sensitive adhesive composition, to realize a cross-linked structure.

Various kinds of polymers known to be able to be used to prepare a pressure-sensitive adhesive may be all used as the polymer. For example, the polymer may include a polymerization unit of a monomer having an alkylene oxide chain and/or a polymerization unit of a monomer containing a nitrogen atom. In this specification, the term "monomer" refers to all kinds of compounds which can form polymers by means of a polymerization reaction, and the term "polymerization unit of a certain monomer" may mean that a polymerization unit is included in side chains or the main chain of a polymer formed by polymerizing the certain monomer.

Examples of the monomer having the alkylene oxide chain may, for example, include a compound represented by the following Formula 1.

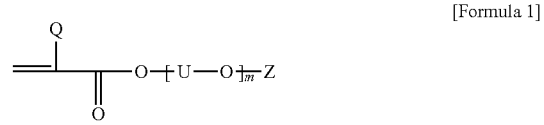

[Formula 1]

In Formula 1, Q represents hydrogen, or an alkyl group, U represents an alkylene group, Z represents hydrogen, an alkyl group, or an aryl group, m is an arbitrary number, for example, a number ranging from 1 to 20.

When two or more units [—U—O—] are present in Formula 1, the number of carbon atoms of U in each of the units may be the same or different.

In Formula 1, m may be, for example, in a range of 1 to 16, 1 to 12, or 2 to 9. Within this range, polymerization efficiency and crystallinity of the polymer can be maintained properly upon preparation of the polymer, and the pressure-sensitive adhesive can be provided with proper conductivity.

Unless particularly defined otherwise in this specification, the term "alkyl group" may refer to an alkyl group having 1 to 20 carbon atoms, 1 to 16 carbon atoms, 1 to 12 carbon atoms, 1 to 8 carbon atoms, or 1 to 4 carbon atoms. The alkyl group may be linear, branched, or cyclic. The alkyl group may be unsubstituted or substituted with one or more substituents.

Unless particularly defined otherwise in this specification, the term "alkylene group" or "alkylidene group" may refer to an alkylene group or an alkylidene group having 1 to 20 carbon atoms, 1 to 16 carbon atoms, 1 to 12 carbon atoms, 1 to 8 carbon atoms, or 1 to 4 carbon atoms. The alkylene group or the alkylidene group may be linear, branched, or cyclic. The alkylene group or the alkylidene group may be substituted with one or more substituents, when necessary.

In Formula 1, Q may be an alkyl group, for example, an alkyl group having 1 to 8 carbon atoms, or 1 to 4 carbon atoms according to another illustrative embodiment. When a compound such as an alkyl group is used as Q, for example, when the pressure-sensitive adhesive composition is applied to the protective film, and the like, the protective film may be easily removed from the adherend without any of residual substances or stains.

Unless particularly defined otherwise in this specification, the term "aryl group" may refers to a monovalent residue derived from a compound or a derivative thereof, which includes a benzene ring or has a structure in which two or more benzene rings are joined together or in which two or more benzene rings are condensed or joined together while sharing one or two or more carbon atoms. The aryl group may be, for example, an aryl group having 6 to 25 carbon atoms, 6 to 22 carbon atoms, 6 to 16 carbon atoms, or 6 to 13 carbon atoms. Examples of such an aryl group may include a phenyl group, a phenylethyl group, a phenylpropyl group, a benzyl group, a tolyl group, a xylyl group, or a naphthyl group.

In this specification, examples of the substituent that may be substituted for a certain functional group, for example, an alkyl group, an alkylidene group or an alkylene group may include an alkyl group, an alkoxy group, an alkenyl group, an epoxy group, a cyano group, a carboxyl group, an acryloyl group, a methacryloyl group, an acryloyloxy group, a methacryloyloxy group, or an aryl group, but the present application is not limited thereto.

Examples of the compound of Formula 1 may include alkoxy dialkylene glycol (meth)acrylic acid ester, alkoxy trialkylene glycol (meth)acrylic acid ester, alkoxy tetraalkylene glycol (meth)acrylic acid ester, aryloxy dialkylene glycol (meth)acrylic acid ester, aryloxy trialkylene glycol (meth)acrylic acid ester, aryloxy tetraalkylene glycol (meth) acrylic acid ester, and polyalkylene glycol monoalkyl ether (meth)acrylic acid ester, which may be used alone or in combination, but the present application is not limited thereto.

As such, examples of the alkoxy may, for example, include an alkoxy having 1 to 20 carbon atoms, 1 to 16 carbon atoms, 1 to 12 carbon atoms, or 1 to 4 carbon atoms. More particularly, the alkoxy may be a methoxy group, or an ethoxy group.

As such, examples of the alkylene glycol may also include an alkylene glycol having 1 to 20 carbon atoms, 1 to 16 carbon atoms, 1 to 12 carbon atoms, or 1 to 4 carbon atoms, for example, ethylene glycol, or propylene glycol. As such, examples of the aryloxy may include an aryloxy having 6 to 24 carbon atoms, or 6 to 12 carbon atoms, for example, phenoxy, or the like.

Kinds of the monomer containing a nitrogen atom (hereinafter simply referred to as a "nitrogen monomer"), which may be included in the polymer, are not particularly limited. For example, an amide group-containing monomer, an amino group-containing monomer, an imide group-containing monomer, or a cyano group-containing monomer may be used as the monomer. As such, examples of the amide group-containing monomer may, for example, include (meth)acrylamide or N,N-dimethyl (meth)acrylamide, N,N-diethyl (meth)acrylamide, N-isopropyl (meth)acrylamide, N-methylol (meth)acrylamide, diacetone (meth)acrylamide, N-vinylacetamide, N,N'-methylene bis(meth)acrylamide, N,N-dimethylaminopropyl (meth)acrylamide, N,N-dimethylaminopropyl methacrylamide, N-vinylpyrrolidone, N-vinylcaprolactam, or (meth)acryloyl morpholine, examples of the amino group-containing monomer may include aminoethyl (meth)acrylate, N,N-dimethylaminoethyl (meth)acrylate, or N,N-dimethylaminopropyl (meth)acrylate, examples of the imide group-containing monomer may include N-isopropylmaleimide, N-cyclohexylmaleimide, or itaconimide, and examples of the cyano group-containing monomer may include acrylonitrile, or methacrylonitrile, but the present application is not limited thereto. Among theses, N,N-dialkyl (meth)acrylamide may be particularly used as the nitrogen monomer to ensure superior peeling properties, for example, a balance between low-speed and high-speed peel strengths, as well as proper physical properties, for example, conductivity. In this case, the N,N-dialkyl (meth)acrylamide may include an alkyl group having 1 to 20 carbon atoms, 1 to 16 carbon atoms, 1 to 12 carbon atoms, 1 to 8 carbon atoms, or 1 to 4 carbon atoms.

The polymer may further include a polymerization unit of a (meth)acrylic acid ester monomer, for example, an alkyl (meth)acrylate.

For example, an alkyl (meth)acrylate including an alkyl group having 1 to 14 carbon atoms may be used as the alkyl (meth)acrylate in consideration of cohesiveness, glass transition temperature, or pressure-sensitive adhesiveness of the pressure-sensitive adhesive. Examples of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate. Among these, one or two or more of the monomers may be included in the polymer as a polymerization unit.

The polymer may, for example, include the polymerization unit of the (meth)acrylic acid ester monomer at 65 parts by weight to 99 parts by weight, and polymerization unit of the monomer and/or nitrogen monomer of Formula 1 at 0.1 parts by weight to 30 parts by weight. Unless particularly defined otherwise in this specification, the unit "part(s) by weight" may refer to a weight ratio between the respective components. For example, the expression "the polymer including the polymerization unit of the (meth)acrylic acid ester monomer at 65 to 99 parts by weight and the polymerization unit of the monomer and/or nitrogen monomer of Formula 1 at 0.1 parts by weight to 30 parts by weight" as described above may means that the polymer is formed from a mixture of monomers including the respective monomers so that the weight ratio (A:B) of the weight (A) of the (meth)acrylic acid ester monomer and the sum (B) of the weights of the monomer and nitrogen monomer of Formula 1 can be "65 to 99:0.1 to 30." According to another illustrative embodiment, the polymer may include the polymerization unit of the (meth)acrylic acid ester monomer at 70 parts by weight to 95 parts by weight, and the polymerization unit of the monomer and/or nitrogen monomer of Formula 1 at 1 part by weight to 20 parts by weight. For example, when the polymer includes both of the polymerization unit of Formula 1 and the polymerization unit of the nitrogen monomer, the polymer may also include the polymerization unit of the monomer of Formula 1 at 0.1 parts by weight to 7 parts by weight, and the polymerization unit of the nitrogen monomer at 1 to 30 parts by weight. According to another illustrative embodiment, the monomer of Formula 1 may be included at a content of 0.5 to 6 parts by weight as the polymerization unit in the polymer, and the nitrogen monomer may be included at a content of approximately 1 to 20 parts by weight, or approximately 1 to 10 parts by weight as the polymerization unit in the polymer. Within this content range, the pressure-sensitive adhesive may exhibit proper pressure-sensitive adhesiveness, and also properly exhibit desired physical properties such as antistatic properties.

Also, the polymer may further include a monomer containing a hydroxyl group as a polymerization unit. The polymerization unit may provide the polymer with a hydroxyl group.

Examples of the monomer containing the hydroxyl group may, for example, include a monomer represented by the following Formula 2.

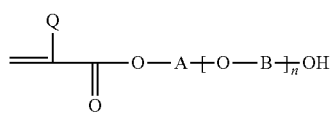

[Formula 2]

In Formula 2, Q represents hydrogen, or an alkyl group, A and B each independently represent an alkylene group, n is an arbitrary number, for example, a number ranging from 0 to 10.

When two or more units [—U—O—] are present in Formula 1, the number of carbon atoms of U in each of the units may be the same or different.

A and B in Formula 2 may, for example, each independently represent a linear alkylene group.

Examples of the compound of Formula 2 may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, or 2-hydroxypropylene glycol (meth)acrylate, but the present application is not limited thereto.

The polymer may include, for example, the polymerization unit of the above-described (meth)acrylic acid ester monomer at 65 parts by weight to 99 parts by weight, the polymerization unit of the monomer containing a hydroxyl group at 0.5 parts by weight to 30 parts by weight or the (meth)acrylic acid ester monomer at 65 to 99 parts by weight, and the polymerization unit of the monomer containing a hydroxyl group at 0.5 parts by weight to 20 parts by weight. Within this content range, the pressure-sensitive adhesive may be endowed with proper cohesiveness, and desired performance such as antistatic properties may be easily ensured as the same time.

According to one illustrative embodiment, two monomers having different carbon atoms present in the side chains may be used as the monomer containing the hydroxyl group.

For example, the polymer may include a polymerization unit of a first monomer, which is represented by the following Formula 2 and in which each of alkylene groups present in A and B of Formula 2 has 1 to 3 carbon atoms, and a polymerization unit of a second monomer, which is represented by Formula 2 and in which each of the alkylene groups present in A and B of Formula 2 has 4 to 20 carbon atoms, 4 to 16 carbon atoms, 4 to 12 carbon atoms, 4 to 8 carbon atoms, or 4 to 6 carbon atoms.

When the number of the carbon atoms is calculated as described above, the number of the carbon atoms of the alkylene groups present in a liner form is contemplated so as to differentiate the first and second monomers. For example, when A and B are substituted with a substituent containing carbon atoms, the carbon atoms of the substituent are not taken into consideration. As described above, the pressure-sensitive adhesive having very excellent peel strength characteristics, that is, a balance between high-speed and low-speed peel strengths may be provided due to the polymerization units of the two hydroxyl group-containing monomers.

When the polymer includes the polymerization unit of the first monomer, and the polymerization unit of the second monomer, the ratios of the respective monomers are not particularly limited. For example, the polymer may include the polymerization unit of the first monomer at 0.1 parts by weight to 30 parts by weight, and the polymerization unit of the second monomer at 0.1 parts by weight to 10 parts by weight. According to another illustrative embodiment, the polymer may include the polymerization unit of the first monomer at approximately 1 part by weight to 25 parts by weight, or approximately 1 part by weight to 20 parts by weight, and the polymerization unit of the second monomer at approximately 0.1 parts by weight to 8 parts by weight, approximately 0.1 parts by weight to 5 parts by weight, or approximately 0.1 to 3 parts by weight. Within this content range, the first monomer may be included in the polymer at a larger amount than that of the second monomer. For example, the weight ratio (A/B) of the weight (A) of the first monomer to the weight (B) of the second monomer may be in a range of approximately 1 to 25, approximately 1 to 20, approximately 1 to 15, or approximately 1 to 10. Within this ratio range, the pressure-sensitive adhesive, which exhibits proper antistatic performance and simultaneously has a proper balance between high-speed and low-speed peel strengths without leaving contaminants behind upon peeling may be provided.

The polymer may further include a known monomer used to prepare the pressure-sensitive adhesive, for example, a carboxyl group-containing monomer such as (meth)acrylic acid, 2-(meth)acryloyloxy acetic acid, 3-(meth)acryloyloxy propylic acid, 4-(meth)acryloyloxy butyric acid, acrylic acid dimer, itconic acid, maleic acid, and a maleic acid anhydride; a monomer containing an isocyanate group; a monomer containing a glycidyl group, such as glycidyl (meth)acrylate; or a radical polymerizable monomer such as styrene, when necessary. Such monomers may be polymerized to be included in the polymer. For example, the monomers may be included in the polymer at a content of approximately 20 parts by weight or less.

The polymer may be prepared by selecting the requisite monomers from the above-described monomers, mixing the selected monomer at desired ratios to prepare a mixture of the monomers and subjecting the mixture of the monomers to a polymerization method such as solution polymerization, photo-polymerization, bulk polymerization, suspension polymerization, or emulsion polymerization.

The pressure-sensitive adhesive composition may include a, photostabilizer, for example, a photostabilizer such as a hindered amine compound. For example, since the pressure-sensitive adhesive is not condensed even when the pressure-sensitive adhesive is kept under a high-temperature condition, such a photostabilizer serves not to cause an increase in concentration of an antistatic agent to be described below in condensed clusters. Also, the photostabilizer serves to prevent radicals from being formed when ether binding sites of alkylene oxide chains included in the polymer are degraded by heat, or prevent the monomer containing a hydroxyl group from resulting in a condensation reaction. As a result, storage stability of the pressure-sensitive adhesive composition may be highly improved.

Examples of the photostabilizer may, for example, include a compound represented by the following Formula 3.

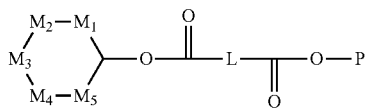

[Formula 3]

In Formula 3, $M_1$ to $M_5$ each independently represent $R^1$—N, $(R^2)(R^3)$—C, or $(R^4)(R^5)$—C where $R^1$ represents hydrogen, an alkyl group, or an alkoxy group, $R^2$ and $R^3$ each independently represent an alkyl group, and $R^4$ and $R^5$ each independently represent hydrogen, or an alkyl group, L represents an alkylene group, or an alkylidene group, and P represents an alkyl group, or a substituent represented by the following Formula 4. In Formula 3, at least one of $M_2$ to $M_4$ may be $R^1$—N, and $M_1$, $M_2$, $M_3$, $M_4$ or $M_5$ present directly adjacent to $M_2$, $M_3$ or $M_4$ that is $R^1$—N may be $(R^2)(R^3)$—C.

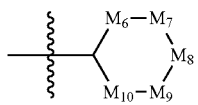

[Formula 4]

In Formula 4, $M_6$ to $M_{10}$ each independently represent $R^1$—N, $(R^2)(R^3)$—C, or $(R^4)(R^5)$—C where $R^1$ represents hydrogen, an alkyl group, or an alkoxy group, $R^2$ and $R^3$ each independently represents an alkyl group, and $R^4$ and $R^5$ each independently represent hydrogen, or an alkyl group. In Formula 4, at least one of $M_7$ to $M_9$ may be $R^1$—N, and $M_6$, $M_7$, $M_8$, $M_9$ or $M_{10}$ present directly adjacent to $M_7$, $M_8$ or $M_9$ that is $R^1$—N may be $(R^2)(R^3)$—C.

In Formulas 3 and 4, the expression "$M_1$ to $M_{10}$ being $R^1$—N, $(R^2)(R^3)$—C or $(R^4)(R^5)$—C" may mean that nitrogen atoms (N) or carbon atoms (C) are present at positions of $M_1$ to $M_{10}$, and the substituents such as $R^1$ to $R^5$ are bound to the nitrogen atoms or the carbon atoms.

In Formula 4, the symbol

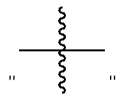

means that a carbon atom in Formula 4 bound to the symbol is bound to an oxygen atom in Formula 3.

In Formula 3, L representing an alkylene group or an alkylidene group may be substituted or unsubstituted, when necessary. For example, L may be substituted with an aryl group. In this case, examples of the aryl group may include 3,5-bis(1,1-dimethylethyl)-4-hydroxyphenyl group, and the like, but the present application is not limited thereto.

In Formula 3, $R^1$ may, for example, represent hydrogen, an alkyl group having 1 to 8 carbon atoms, or 1 to 4 carbon atoms, or an alkoxy group having 4 to 16 carbon atoms, or 4 to 12 carbon atoms. The alkyl group or the alkoxy group may be linear, or branched, and may be substituted with one or more substituents.

In Formula 3, $R^2$, $R^3$ and P may each independently represent an alkyl group having 1 to 12 carbon atoms, 1 to 8 carbon atoms, or 1 to 4 carbon atoms. The alkyl group may be linear, or branched, and may be substituted with one or more substituents.

In Formula 3, $R^4$ and $R^5$ may also be hydrogen.

Also, in Formula 3, L may, for example, represent an alkylene group having 4 to 12 carbon atoms, or 6 to 10 carbon atoms, or an alkylidene group having 2 to 10 carbon atoms, or 4 to 8 carbon atoms. The alkylene group or the alkylidene group may be linear, or branched, and may be substituted with one or more substituents.

Examples of the compound of Formula 3 may, for example, include bis(1,2,2,6,6-pentamethyl-4-piperidyl)sebacate, methyl 1,2,2,6,6-pentamethyl-4-piperidyl sebacate, propanedioic acid 2-[[3,5-bis(1,1-dimethylethyl)-4-hydroxyphenyl]methyl]-2-butyl-1,3-bis(1,2,2,6,6-pentamethyl-4-piperidinyl) ester, bis(2,2,6,6-tetramethyl-4-piperidyl)sebacate, or bis(1-octyloxy-2,2,6,6-tetramethyl-4-piperidinyl)sebacate, but the present application is not limited thereto.

The compound of Formula 3 may be, for example, included at a content of 0.01 parts by weight to 10 parts by weight, 0.05 parts by weight to 10 parts by weight, 0.05 parts by weight to 8 parts by weight, 0.05 parts by weight to 6 parts by weight, or 0.05 parts by weight to 5 parts by weight, relative to 100 parts by weight of the polymer in the pressure-sensitive adhesive composition. Within this content range, the pressure-sensitive adhesive composition, which effectively prevents occurrence of radicals by decomposition of the alkylene oxide chain or condensation of the hydroxyl group-containing monomers, and thus may exhibit excellent storage stability, may be provided.

The pressure-sensitive adhesive composition may further include a cross-linking agent. The cross-linking agent may react with a cross-linking point of the polymer to realize a cross-linked structure.

For example, an aliphatic isocyanate cross-linking agent may be used as the cross-linking agent. Such a cross-linking agent reacts with the polymer, that is, a polymer including two or more monomers containing a hydroxyl group to realize a cross-linked structure, a pressure-sensitive adhesive having desired antistatic characteristics as well as proper low-speed and high-speed peel strengths may be realized. For example, a cross-linking agent including an aliphatic cyclic isocyanate compound and/or an aliphatic non-cyclic isocyanate compound may be used as the cross-linking agent. As such, the term "aliphatic cyclic isocyanate compound" refers to an isocyanate compound having a ring structure, wherein the ring structure does not belong to an aromatic ring. For example, the aliphatic non-cyclic isocyanate compound may refer to an aliphatic linear or branched isocyanate compound. As such, examples of the aliphatic cyclic isocyanate compound may, for example, include an isocyanate compound such as isophorone diisocyanate, methylene dicyclohexyl diisocyanate, or cyclohexane diisocyanate; a derivative such as a dimer or a trimer of the isocyanate compound; or a reaction product of the isocyanate compound and a polyol (for example, trimethylolpropane), and examples of the aliphatic non-cyclic isocyanate compound may include an alkylene diisocyanate compound having 1 to 20 carbon atoms, 1 to 16 carbon atoms, 1 to 12 carbon atoms, or 1 to 8 carbon atoms, such as hexamethylene diisocyanate; a derivative such as a dimer or a trimer of the alkylene diisocyanate compound; or a reaction product of the alkylene diisocyanate compound and a polyol (for example, trimethylolpropane), but the present application is not limited thereto.

As such, when the aliphatic cyclic isocyanate compound and the aliphatic non-cyclic isocyanate compound are used together, the ratios of the aliphatic cyclic isocyanate compound and the aliphatic non-cyclic isocyanate compound are not particularly limited, and may be properly selected, when necessary. Typically, the aliphatic non-cyclic isocyanate compound may be included at a content of approximately 1 part by weight to 500 parts by weight, or approximately 20 parts by weight to 300 parts by weight in the cross-linking agent, relative to 100 parts by weight of the aliphatic cyclic isocyanate compound. Commercially available cross-linking agents may be used as such a cross-linking agent, that is, a cross-linking agent including the aliphatic cyclic isocyanate compound and the aliphatic non-cyclic isocyanate compound. Examples of the cross-linking agent may include MHG-80B and Duranate P commercially available from Asahi Kasei Chemicals Corp., or NZ-1 commercially available from BAYER AG.

When another cross-linking agent is required in addition to the above-described cross-linking agent, a known cross-linking agent such as a metal chelate cross-linking agent, which is a compound in which an epoxy cross-linking agent such as ethylene glycol diglycidylether, triglycidylether, trimethylolpropane triglycidylether, N,N,N',N'-tetraglycidyl ethylenediamine, or glycerine diglycidylether; an aziridine cross-linking agent such as N,N'-toluene-2,4-bis(1-aziridine carboxamide), N,N'-diphenylmethane-4,4'-bis(1-aziridine carboxamide), triethylene melamine, bisisophthaloyl-1-(2-methylaziridine), or tri-1-aziridinylphosphine oxide; or a polyvalent metal such as aluminum, iron, zinc, tin, titanium, antimony, magnesium and/or vanadium is coordinated with acetyl acetone or ethyl acetoacetate, may be used together as the cross-linking agent.

The pressure-sensitive adhesive composition may include the cross-linking agent at 0.01 parts by weight to 10 parts by weight, or 0.01 parts by weight to 5 parts by weight, relative to 100 parts by weight of the polymer. Within this content range, a proper cross-linked structure may be realized, and the low-speed and high-speed peel strengths of the pressure-sensitive adhesive may be adjusted to a desired extent.

The pressure-sensitive adhesive composition may further include an antistatic agent. For example, an ionic compound may be used as the antistatic agent.

A metal salt may be, for example, used as the ionic compound. The metal salt may, for example, include an alkali metal cation, or an alkaline earth metal cation. Examples of the cation may include one or two or more of lithium ion ($Li^+$), sodium ion ($Na^+$), potassium ion ($K^+$), rubidium ion ($Rb^+$), cesium ion ($Cs^+$), beryllium ion ($Be^{2+}$), magnesium ion ($Mg^{2+}$), calcium ion ($Ca^{2+}$), strontium ion ($Sr^{2+}$), and barium ion ($Ba^{2+}$). For example, one or two or more of lithium ion, sodium ion, potassium ion, magnesium ion, calcium ion and barium ion may be used as the cation. In this case, lithium ion may be used in consideration of ionic stability and mobility.

Examples of the anion included in the ionic compound may include $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), or trispentafluoroethyl trifluorophosphate ($P(C_2F_5)_3F_3^-$).

According to another illustrative embodiment, an anion represented by the following Formula 5, or bis(fluorosulfonyl) imide may be used as the anion.

 [Formula 5]

In Formula 5, X represents a nitrogen atom, or a carbon atom, Y represents a carbon atom, or a sulfur atom, $R_f$ represents a perfluoroalkyl group, m is 1 or 2, and n is 2 or 3.

In Formula 5, m may be 1 when Y is carbon, m may be 2 when Y is sulfur, n may be 2 when X is nitrogen, and n may be 3 when X is carbon.

The anion of Formula 5 or the bis(fluorosulfonyl) imide has high electronegativity due to the presence of a perfluoroalkyl group ($R_f$) or a fluoro group, and also has a unique resonance structure. Thus, the anion of Formula 5 or the bis(fluorosulfonyl) imide forms a weak bond with the cation, and simultaneously exhibits hydrophobicity. Therefore, the ionic compound may exhibit excellent compatibility with the other components of the composition, such as a polymer, and also give high antistatic properties even when used at a small amount.

$R_f$ of Formula 5 may be a perfluoroalkyl group having 1 to 20 carbon atoms, 1 to 12 carbon atoms, 1 to 8 carbon atoms, or 1 to 4 carbon atoms. In this case, the perfluoroalkyl group may have a linear, branched or cyclic structure. The anion of Formula 5 may be a sulfonyl methide-based, sulfonyl imide-based, carbonyl methide-based, or carbonyl imide-based anion. More particularly, the anion of Formula 5 may include tristrifluoromethanesulfonyl methide, bistrifluoromethanesulfonyl imide, bisperfluorobutanesulfonyl imide, bispentafluoroethanesulfonyl imide, tristrifluoromethanecarbonyl methide, bisperfluorobutanecarbonyl imide, or bispentafluoroethanecarbonyl imide, which may be used alone or in combination.

For example, an organic salt, which includes a quaternary ammonium, phosphonium, pyridinium, imidazolium, pyrolidinium, or piperidinium together with the anion component, may be used as the ionic compound, for example, a cation. Here, examples of the quaternary ammonium may include N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexyl ammonium, N-ethyl-N,N,N-trihexylammonium, N-methyl-N,N,N-trioctylammonium, or N-ethyl-N,N,N-trioctylammonium, and the metal salt and the organic salt may be used together, when necessary.

In the pressure-sensitive adhesive composition, the content of the ionic compound is not particularly limited. For example, the ionic compound may be present at a content of 0.01 parts by weight to 5 parts by weight, relative to 100 parts by weight of the polymer. The content of the ionic compound may be altered in consideration of desired antistatic properties, or compatibility between the components.

The pressure-sensitive adhesive composition may further include a silane coupling agent. Examples of the coupling agent may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanato propyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyaceto trimethoxy silane, which may be used alone or in combination. For example, it is desirable that a silane coupling agent congaining an acetoacetate group or a β-cyanoacetyl group is used as the silane coupling agent. The silane coupling agent may be included at a content of 0.01 parts by weight to 5 parts by weight, or 0.01 parts by weight to 1 part by weight, relative to 100 parts by weight of the polymer. Within this content range, an effect of properly improving pressure-sensitive adhesiveness, and durable reliability may be ensured.

Also, the pressure-sensitive adhesive composition may further include a tackifier in an aspect of controlling the pressure-sensitive adhesiveness. Examples of the tackifier may include a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or a polymerized rosin ester resin, which may be used alone or in combination. The tackifier may be included at a content of 1 part by weight to 100 parts by weight in the composition, relative to 100 parts by weight of the copolymer. Within this content range, a proper addition effect, and an effect of improving compatibility and cohesiveness may be ensured.

The pressure-sensitive adhesive composition may further include at least one additive selected from the group consisting of a coordination compound capable of forming a coordinate bond with the antistatic agent, a photoinitiator, a multifunctional acrylate, an epoxy resin, a cross-linking agent, a UV stabilizer, an antioxidant, a toning agent, a reinforcing agent, a filler, an antifoaming agent, a surfactant, and a plasticizer without affecting the effects of this application.

The pressure-sensitive adhesive composition may have a low-speed peel strength of approximately 1 gf/25 mm to 40 gf/25 mm, 1 gf/25 mm to 30 gf/25 mm, 1 gf/25 mm to 20 gf/25 mm, or 1 gf/25 mm to 10 gf/25 mm, and a high-speed peel strength of 10 gf/25 mm to 150 gf/25 mm, or 10 gf/25 mm to 100 gf/25 mm with respect to an adherend having a surface energy of 30 mN/m or less in a state in which the cross-linked structure is realized.

A such, the term "low-speed peel strength" may, for example, refer to a peel strength measured at a peel angle of 180° and a peel rate of 0.3 m/min, and the term "high-speed peel strength" may refer to a peel strength measured at a peel angle of 180° and a peel rate of 30 m/min.

More particularly, each of the peel strengths may be measured at the above-described peel angle and peel rate after a pressure-sensitive adhesive composition whose cross-linked structure is realized is attached to an adherend having a surface energy of 30 mN/m or less and kept at a temperature of 23° C. and a relative humidity of 65% for 24 hours. A specific method of measuring each peel strength will be described in the following Examples.

As such, a method of measuring the surface energy of the adherend is not particularly limited. For example, the surface energy of the adherend may be measured using known method of measuring the surface energy. In this case, a contact angle of the adherend may be measured, and the surface energy may be calculated from the contact angle, or the surface energy may be measured using a known surface energy measuring machine. The surface energy of the adherend may, for example, be in a range of approximately 10 m/N/m to 30 mN/m.

For the pressure-sensitive adhesive composition, the ratio (H/L) of the high-speed peel strength (H) to the low-speed peel strength (L) may also be in a range of 1 to 20, 5 to 20, or 7 to 15.

Also, the pressure-sensitive adhesive composition may have an electrostatic discharge voltage of 0.7 kV, which occurs when the pressure-sensitive adhesive composition is peeled from the adherend, that is, an adherend having a surface energy of 30 mN/m or less, at a peel angle of 180° and a peel rate of 40 m/min in a state in which the cross-linked structure is realized. A method of measuring the electrostatic discharge voltage will be described in the following Examples.

When the low-speed peel strength, the high-speed peel strength and/or the electrostatic discharge voltage are ensured as described above, the pressure-sensitive adhesive composition may be peeled at a high speed while exhibiting a proper protective function to the adherend and minimizing generation of static electricity, etc.

Also, the present application is directed to providing a pressure-sensitive adhesive sheet. For example, the pressure-sensitive adhesive sheet may be a protective film, particularly a protective film for optical elements.

For example, the pressure-sensitive adhesive sheet may be used as a protective film for optical elements, such as a polarizing plate, a polarizer, a polarizer protective film, a retardation film, a viewing angle-compensating film, a brightness-improving film, and the like. In this specification, the terms "polarizer" and "polarizing plate" refer to distinct subjects. That is, the polarizer refers to a film, a sheet or an element showing a polarizing function per se, and the polarizing plate refers to an optical element including another component together with the polarizer. Examples of the component that may be included together with the polarizer may include a polarizer protective film, or a retardation layer, but the present application is not limited thereto.

The pressure-sensitive adhesive sheet may, for example, include a base film for surface protection, and a pressure-sensitive adhesive layer disposed at one side of the base film. For example, the pressure-sensitive adhesive layer may include the pressure-sensitive adhesive composition, such as a cross-linked pressure-sensitive adhesive composition, that is, a pressure-sensitive adhesive composition whose cross-linked structure is realized.

The pressure-sensitive adhesive composition has a relatively high low-speed peel strength and a relatively low high-speed peel strength after formation of a cross-linked structure, and also shows an excellent balance between the low-speed and high-speed peel strengths, and superior durable reliability, workability, transparency and antistatic properties. Therefore, the protective film may be effectively used as a surface protective film for protecting surfaces of optical elements such as a polarizing plate, a retardation plate, an optical compensation film, a reflective sheet and a brightness-improving film, all of which are used for various optical devices or parts thereof, or display devices or parts thereof, for example, LCDs, but the present application is not limited to the use of the protective film.

Typical films or sheets known in the related art may be used as the base film for surface protection. For example, the base film for surface protection may include a polyester film such as polyethylene terephthalate, or polybutylene terephthalate, or a plastic film such as a polytetrafluorethylene film, a polyethylene film, a polypropylene film, a polybutene film, a polybutadiene film, a poly(vinyl chloride) film, or a polyimide film. Such a film may be formed in a single-layer structure or a structure in which at least two layers are stacked. Optionally, the film may further include a functional layer such as an antifouling layer, or an antistatic layer. Also, one or both surfaces of the base film may be subjected to surface treatment such as primer treatment in an aspect of improving base adhesion.

The thickness of the base film may be properly determined according to applications, but the present application is not limited thereto. Typically, the base film may be formed to have a thickness of 5 μm to 500 μm, or 10 μm to 100 μm.

The thickness of the pressure-sensitive adhesive layer included in the pressure-sensitive adhesive sheet is not particularly limited, but may, for example, in a range of 2 μm to 100 μm, or 5 μm to 50 μm.

A method of forming a pressure-sensitive adhesive layer is not particularly limited. For example, the pressure-sensitive adhesive layer may be formed by coating a base film with a pressure-sensitive adhesive composition or a coating solution prepared from the pressure-sensitive adhesive composition using a conventional tool such as a bar coater and curing the pressure-sensitive adhesive composition or the coating solution, or by first coating a surface of a detachable base with a pressure-sensitive adhesive composition or a coating solution, curing the pressure-sensitive adhesive composition or the coating solution, and then transferring the pressure-sensitive adhesive composition or the coating solution to a base film.

The method of forming a pressure-sensitive adhesive layer may be preferably performed after bubble-forming components such as volatile components or residual reaction products are sufficiently removed from the pressure-sensitive adhesive composition or the coating solution. As a result, it is possible to prevent the modulus of elasticity from being degraded due to extremely low cross-linking density or molecular weight of the pressure-sensitive adhesive, and also prevent scatterers from being formed in bubbles when the bubbles increasingly occur between a glass plate and a pressure-sensitive adhesive layer under a high-temperature condition.

In such a method, a process of curing a pressure-sensitive adhesive composition is not particularly limited. For example, the pressure-sensitive adhesive composition may be cured by subjecting the pressure-sensitive adhesive composition to a proper aging process so that the polymer and the cross-linking agent in the composition can react with each other, or may be cured by irradiation with light, for example irradiation with UV rays, which can induce activation of an photoinitiator in the composition.

For example, the pressure-sensitive adhesive layer may have a gel content of approximately 80% to 99%. The gel content may, for example, be calculated by the following Equation 1.

$$\text{Gel content} = B/A \times 100 \qquad [\text{Equation 1}]$$

In Equation 1, A represents a mass of the pressure-sensitive adhesive, and B represents an insoluble dry mass collected after the pressure-sensitive adhesive is deposited in ethyl acetate at room temperature for 48 hours.

Also, the present application is directed to providing an optical element. The optical element according to one illustrative embodiment may include an optical element, and the pressure-sensitive adhesive sheet attached to a surface of the optical element. For example, the pressure-sensitive adhesive layer of the pressure-sensitive adhesive sheet is attached to the surface of the optical element, and thus the optical element may be protected by the base film for surface protection.

Examples of the optical element included in the optical element may, for example, include a polarizer, a polarizing plate, a polarizer protective film, a retardation layer, or a viewing angle compensation layer.

As such, examples of the polarizer may include typical types of polarizers known in the related art, for example, a polyvinyl alcohol polarizer, which may be used without limitation.

The polarizer is a functional film or sheet that can extract light vibrating in one direction from incident light while vibrating in various directions. For example, such a polarizer may have a structure in which a dichroic dye is adsorbed onto a polyvinyl alcohol-based resin film and aligned. The polyvinyl alcohol-based resin constituting the polarizer may be, for example, obtained by gelling a polyvinyl acetate-based resin. In this case, the polyvinyl acetate-based resin that may be used herein may include vinyl acetate, and a copolymer of other monomers polymerizable with the vinyl acetate, as well as a homopolymer of vinyl acetate. As such, examples of the monomer polymerizable with the vinyl acetate may include an unsaturated carboxylic acid, an olefin, a vinyl ether, an unsaturated sulfonic acid, and an acrylamide containing an ammonium group, which may be used alone or in combination, but the present application is not limited thereto. Typically, the polyvinyl alcohol-based resin may have a degree of gelation of approximately 85 mole % to 100 mole %, preferably 98 mole % or more. The polyvinyl alcohol-based resin may be further modified. For example, polyvinyl formal or polyvinyl acetal modified with an aldehyde may be used. Also, the polyvinyl alcohol-based resin may typically have a degree of polymerization of approximately 1,000 to 10,000, preferably approximately 1,500 to 5,000.

A film may be formed using the polyvinyl alcohol-based resin, and used as a disk film for polarizers. A method of forming a film from the polyvinyl alcohol-based resin is not particularly limited. For example, a film may be formed from the polyvinyl alcohol-based resin using conventional method known in the related art. The thickness of the disk film formed from the polyvinyl alcohol-based resin is not particularly limited. For example, the disk film may be properly controlled within a thickness of 1 μm to 150 μm. In this case, the disk film may be controlled to a thickness of 10 μm or more in consideration of ease of elongation. The polarizer may be prepared through a process of elongating (for example, uniaxially elongating) the above-described polyvinyl alcohol-based resin film, a process of staining the polyvinyl alcohol-based resin film with a dichroic dye and adsorbing the dichroic dye, a process of treating the polyvinyl alcohol-based resin film onto which the dichroic dye is adsorbed with an aqueous boric acid solution and washing the polyvinyl alcohol-based resin film, etc. As such, iodine or a dichroic organic dye may be used as the dichroic dye.

The polarizing plate may include, for example, the polarizer; and another optical film(s) attached to one or both sides of the polarizer. As such, examples of the another optical film may include the polarizer protective film, the retardation layer, the viewing angle compensation layer, or the anti-glare layer as described above.

As such, the polarizer protective film differentiates from a protective film including the pressure-sensitive adhesive layer, and thus is a protective film for protecting the polarizer. For example, the polarizer protective film may be formed as a multilayer film obtained by staking the protective films including a cellulose-based film such as triacetyl cellulose; an acrylic film; a polyester-based film such as a polycarbonate film, or a polyethylene terephthalate film; a polyethersulfone-based film; and/or a polyolefin-based film such as a polyethylene film, a polypropylene film, a polyolefin film having a cyclo-based or norbornene structure, or an ethylene propylene copolymer. Also the thickness of the protective film is not particularly limited. For example, the protective film may be formed to have a typical thickness.

In the case of the optical element, a surface-treated layer may be present on a surface of the optical element protected by the protective film. For example, the surface-treated layer may have a surface energy of 30 mN/m or less. That is, the surface-treated layer having a surface energy of 30 mN/m or less may be formed on the surface of the optical element protected by the protective film in the optical element, and the pressure-sensitive adhesive layer of the protective film may be attached to the surface-treated layer.

Examples of the surface-treated layer may include a glare shielding layer such as a high-hardness layer, an anti-glare (AG) layer or a semi-glare (SG) layer, or a low reflective layer such as an anti-reflection (AR) layer or a low reflection (LR) layer.

The high-hardness layer may be a layer having a pencil hardness of 1H or more or 2H or more at a load of 500 g. The pencil hardness may be, for example, measured according to the ASTM D 3363 standard using pencil leads prescribed in KS G 2603.

The high-hardness layer may be, for example, a resin layer having high hardness. The resin layer may, for example, include a room-temperature-curable, moisture-curable, thermosetting or active energy ray-curable resin composition in a cured state. According to one illustrative embodiment, the resin layer may include a thermosetting or active energy ray-curable resin composition, or an active energy ray-curable resin composition in a cured state. In description of the high-hardness layer, the term "cured state" may refer to a state in which components included in each resin composition are subjected to a cross-linking reaction or a polymerization reaction to convert the resin composition into a hard state. As such, the room-temperature-curable, moisture-curable, thermosetting or active energy ray-curable resin composition may also refer to a composition whose cured state may be induced at room temperature or induced in the presence of proper moisture or by application of heat or irradiation with active energy rays.

A variety of resin compositions which can satisfy this range of pencil hardness when they are cured are known in the related art, and a suitable resin composition may be readily selected by a person of ordinary skill in the art.

According to one illustrative embodiment, the resin composition may include an acrylic compound, an epoxy compound, a urethane-based compound, a phenolic compound or a polyester compound as a major component. As such, the term "compound" may be a monomeric, oligomeric or polymeric compound.

According to one illustrative embodiment, an acrylic resin composition showing excellent optical properties such as transparency and superior yellowing resistance, preferably an active energy ray-curable acrylic resin composition, may be used as the resin composition.

For example, the active energy ray-curable acrylic composition may include an active energy ray-polymerizable polymer component and a reactive diluting monomer.

Examples of the polymer component may include a component widely known in the related art as an active energy ray-polymerizable oligomer, such as urethane acrylate, epoxy acrylate, ether acrylate or ester acrylate, or a polymerization product of a mixture including a monomer such as a (meth)acrylic ester monomer. As such, examples of the (meth)acrylic ester monomer may include an alkyl (meth)acrylate, a (meth)acrylate having an aromatic group, a heterocyclic (meth)acrylate, or an alkoxy (meth)acrylate. A variety of polymer components used to prepare the active energy ray-curable composition are known in the related art, and the above-described compounds may be selected, when necessary.

Examples of the reactive diluting monomer that may be included in the active energy ray-curable acrylic composition may include a monomer having one or two or more active energy ray-curable functional groups, for example, acryloyl groups or (meth)acryloyl groups. For example, the (meth)acrylic acid ester monomer or the multifunctional acrylate may be used as the reactive diluting monomer.

A method of selecting the components used to prepare the active energy ray-curable acrylic composition, and a blending ratio of the selected components are not particularly limited, and may be adjusted in consideration of desired hardness and other physical properties of the resin layer.

For example, a resin layer having an uneven surface formed therein and a resin layer including particles may be used as the glare shielding layer such as an AG or SG layer. Also, another resin layer including particles having a different refractive index than the particles of the resin layer may also be used.

As such, a resin layer used to form the high-hardness layer may be, for example, used as the resin layer. When the glare shielding layer is formed, the components of the resin composition may not necessarily be adjusted so that the resin layer can surely show high hardness, but the resin layer may be formed so that the resin layer can show the high hardness.

As such, a method of forming an uneven surface on a resin layer is not particularly limited. For example, the uneven structure may be realized by curing the resin composition while bringing a coating layer of the resin composition into contact with a mold having a desired uneven structure, or by blending particles having suitable particle sizes with a resin composition and coating and curing the resin composition.

The glare shielding layer may also be formed using particles having a different refractive index than the resin layer.

According to one illustrative embodiment, the particles may, for example, have a difference in refractive index of 0.03 or less or 0.02 to 0.2 with respect to the resin layer. When the difference in refractive index is extremely small, it is difficult to induce haze. On the other hand, when the difference in refractive index is extremely high, scattering in the resin layer may often cause an increase in haze, but light transmittance or contrast characteristics may be degraded. Therefore, the particles may be properly selected in consideration of these facts.

The shape of the particles included in the resin layer is not particularly limited. For example, the particles may have a spherical, oval, polyhedral, amorphous shape or other shapes. The particles may have an average diameter of 50 nm to 5,000 nm. According to one illustrative embodiment, particles having an uneven surface formed therein may be used as the particles. Such particles may, for example, have an average surface roughness (Rz) of 10 nm to 50 nm, or 20 nm to 40 nm, and/or a maximum height of protrusions formed on the particle surfaces may be in a range of approximately 100 nm to 500 nm, or 200 nm to 400 nm, and a width between the protrusions may be in a range of 400 nm to 1,200 nm, or 600 nm to 1,000 nm Such particles are highly compatible with the resin layer, and show excellent dispersibility in the resin layer.

Examples of the particles may include various inorganic or organic particles. Examples of the inorganic particles may include silica, amorphous titania, amorphous zirconia, indium oxide, alumina, amorphous zinc oxide, amorphous cerium oxide, barium oxide, calcium carbonate, amorphous barium titanate, or barium sulfate, and examples of the organic particles may include particles including a cross-linked or uncross-linked product formed of an organic material such as an acrylic resin, a styrene resin, a urethane resin, a melamine resin, a benzoguanamine resin, an epoxy resin, or a silicon resin, but the present application is not limited thereto.

The uneven structure formed in the resin layer, or the content of the particles is not particularly limited. For example, in the case of the AG layer, the shape of the uneven structure or the content of the particles may be adjusted so that a haze value of the resin layer may be in a range of approximately 5% to 15%, 7% to 13%, or approximately 10%, and, in the case of the SG layer, the shape of the uneven structure or the content of the particles may be adjusted so that a haze value of the resin layer may be in a range of approximately 1% to 3%. For example, the haze value may be measured according to the manufacturer's manual using a hazemeter such as HR-100 or HM-150 (commercially available from SEPUNG).

The low reflective layer such as an AR or LR layer may be formed by coating a low refractive index material. Low refractive index materials which may be used to form the low reflective layer are widely known in the related art. All the low refractive index materials may be properly selected and used in the optical element. The low reflective layer may be formed through coating of the low refractive index material so that the low reflective layer can have a reflexibility of approximately 1% or less.

To form the surface-treated layer, materials known in Korean Unexamined Patent Application Publication Nos. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801 and 2009-0049557 may also be used.

The surface-treated layer may be formed of the known materials, either alone or in combination. Examples of the combination may include a case in which a high-hardness layer is first formed on a surface of a base layer and a low-reflection layer is then formed on a surface of the high-hardness layer.

Further, the present application is directed to providing a display device, for example, a liquid crystal display device (LCD). The display device according to one illustrative embodiment may include a liquid crystal panel, and the optical element may be attached to one or both surfaces of the liquid crystal panel. For example, the film may be attached to the liquid crystal panel using an adhesive or a pressure-sensitive adhesive. As such, the adhesive or pressure-sensitive adhesive is another adhesive or a pressure-sensitive adhesive in addition to the pressure-sensitive adhesive present in the above-described protective film.

Kinds of the liquid crystal panel included in the liquid crystal display device are not particularly limited. For example, all kinds of known panels, for example, various passive matrix panels such as a twisted nematic (TN) panel, super-twisted nematic (STN) panel, ferroelectic (F) panel, and a polymer-dispersed (PD) panel; various active matrix panels such as a two-terminal panel and a three-terminal panel; an in-plane switching (IPS)-mode panel, and a vertical alignment (VA)-mode panel, may be used, but the present application is not limited thereto. Also, the kinds of other components included in the liquid crystal display device, and a method of preparing the same are not also particularly limited. For example, the conventional components known in the related art may be used without limitation.

Effect

The pressure-sensitive adhesive composition according to one illustrative embodiment of the present application has excellent storage stability, exhibits proper low-speed and high-speed peel strengths after formation of a cross-linked structure, and also has an excellent balance between the low-speed and high-speed peel strengths. Therefore, when the pressure-sensitive adhesive composition is, for example, applied to a protective film, the pressure-sensitive adhesive composition can have an excellent protective effect, and can also be advantageous to perform a high-speed process since the pressure-sensitive adhesive composition is easily peeled during a high-speed peeling process. Thus, the pressure-sensitive adhesive composition can exhibit excellent antistatic characteristics during the high-speed peeling process.

ILLUSTRATIVE EMBODIMENTS

Hereinafter, the pressure-sensitive adhesive composition will be described in further detail with reference to Examples and Comparative Examples. However, it should be understood that the following Examples are not intended to limit the scope of the pressure-sensitive adhesive composition.

1. Measurement of Solid Content

The solid content was determined by putting a prepared polymerization solution on a disposable aluminum dish, weighing the polymerization solution, drying the polymerization solution at a temperature of approximately 120° C. for approximately 3 hours in a laboratory convection oven, and calculating the weights of the polymerization solution before and after drying.

2. Measurement of Viscosity

Approximately 200 g of a polymerized acrylic copolymer was put into a 250-mL glass bottle, and the glass bottle was put into a thermostatic bath whose temperature was set to 23° C., and then kept for 30 minutes. When the temperature equilibrium was reached, the viscosity was measured in RPM intervals, in which the confidence intervals are maintained, using a rotational viscometer (Brookfield viscometer (DV-II+)).

3. Measurement of Low-Speed Peel Strength

The pressure-sensitive adhesive sheets prepared in Examples and Comparative Examples were attached to a glare shielding layer of a polarizing plate having the glare shielding layer formed therein using a 2 kg roller according to the JIS Z 0237 standard. Thereafter, the pressure-sensitive adhesive sheets were kept at a temperature of 23° C. and a relative humidity of 65% for 24 hours, and then cut at a width of 25 mm and a length of 120 mm to prepare test samples. Then, the test samples were fixed in a glass substrate, and then measured for peel strength using a tensile tester while horizontally peeling the pressure-sensitive adhesive sheets from the glare shielding layer at a peel angle of 180° and a peel rate of 0.3 m/min. The peel strength was determined by measuring the two same test samples and averaging the measured values.

4. Measurement of High-Speed Peel Strength

The pressure-sensitive adhesive sheets prepared in Examples and Comparative Examples were attached to a glare shielding layer of a polarizing plate having the glare shielding layer formed therein using a 2 kg roller according to the JIS Z 0237 standard. Thereafter, the pressure-sensitive adhesive sheets were kept at a temperature of 23° C. and a relative humidity of 65% for 24 hours, and then cut at a width of 25 mm and a length of 250 mm to prepare test samples. Then, the test samples were fixed in a glass substrate, and then measured for peel strength using a tensile tester while horizontally peeling the pressure-sensitive adhesive sheets from the glare shielding layer at a peel angle of 180° and a peel rate of 30 m/min. The peel strength was determined by measuring the two same test samples and averaging the measured values.

5. Measurement of Electrostatic Discharge (ESD) Voltage

Test samples having a width of approximately 22 cm and a length of approximately 25 cm were prepared in the same manner as in the test samples used to measure the low-speed and high-speed peel strengths. Thereafter, the test samples were fixed in a glass substrate, and the pressure-sensitive adhesive sheets were measured for ESD voltage using a tensile tester while peeling the pressure-sensitive adhesive sheets from the test samples at a peel angle of approximately 180° and a peel rate of 40 m/min 6. Occurrence of Stains after Removal of Pressure-Sensitive Adhesive Sheets The pressure-sensitive adhesive sheets were peeled from the same test samples as the test samples used to measure the low-speed peel strength, and it was then observed that stains occurred on a surface of an adherend due to the static electricity. Then, the occurrence of the stains was evaluated according to the following criteria.
<Criteria for Evaluation>
A: No stains occur on a surface of an adherend
B: Stains occur on a surface of an adherend Preparative Example 1

Preparation of Acrylic Copolymer A 80 parts by weight of 2-ethylhexyl acrylate (2-EHA), 2 parts by weight of 4-hydroxybutyl acrylate (4-HBA), 8 parts by weight of 2-hydroxyethyl acrylate (2-HEA), and 10 parts by weight of polyethylene glycol monomethylether methacrylate (added ethylene oxide unit mole number: 9 moles) were put into a 1-L reactor equipped with a cooling device to facilitate the reflux of nitrogen gas and easily adjust the temperature control, and 100 parts by weight of ethyl acetate was added as a solvent. Thereafter, the reactor was purged with nitrogen gas for an hour to remove oxygen, and a reaction initiator (AIBN: azobisisobutyronitrile) was added, and reacted for approximately 8 hours, and the reaction product was diluted with ethyl acetate to prepare an acrylic copolymer A. The viscosity of the copolymer A was approximately 2,500 cP, and the solid content was approximately 45%.

Preparative Examples 2 to 10

Preparation of Acrylic Copolymers B to J

Acrylic copolymers were prepared in the same manner as in Preparative Example 1, except that the ratios of the monomers used to prepare a copolymer were altered as listed in the following Tables 1 and 2.

TABLE 1

| | Preparative Example | | | | | | | | | |
|---|---|---|---|---|---|---|---|---|---|---|
| | 1 | 2 | 3 | 4 | 5 | 6 | 7 | 8 | 9 | 10 |
| Copolymer | A | B | C | D | E | F | G | H | I | J |
| EHA | 80 | 69 | 70 | 75 | 80 | 81.5 | 81 | 50 | 60 | 78 |
| BA | — | 5 | 5 | — | — | — | — | 10 | — | 5 |
| HBA | 2 | 3 | 1 | 5 | 2 | 1.5 | 12 | — | 2 | 2 |
| HEA | 8 | 8 | 20 | 5 | 15 | 2 | 3 | 35 | 8 | — |
| DMAA | | | | | | | | | | |
| PEGMA | 10 | 15 | 4 | 15 | 3 | 15 | 4 | 5 | 30 | 15 |
| Solid content (%) | 45 | 45 | 45 | 45 | 45 | 45 | 45 | 45 | 45 | 45 |
| Viscosity (cP) | 2,500 | 2,500 | 2,900 | 2,600 | 2,450 | 2,700 | 2,500 | 4,200 | 3,000 | 2,500 |

Unit of content: part(s) by weight
EHA: 2-ethylhexyl acrylate
BA: butyl acrylate
HBA: 4-hydroxybutyl acrylate
HEA: 2-hydroxyethyl acrylate
PEGMA: polyethylene glycol monomethylether methacrylate (added ethylene oxide unit mole number: 9 moles)
DMAA: dimethylacrylamide

TABLE 2

| | Preparative Example | | | |
|---|---|---|---|---|
| | 11 | 12 | 13 | 14 |
| copolymer | K | L | M | O |
| EHA | 92 | 85 | 72 | 83 |
| BA | | | 5 | |
| HBA | | 2 | 2 | 2 |
| HEA | 2 | 5 | 10 | 15 |
| DMAA | 6 | 3 | 6 | |
| PEGMA | | 5 | 5 | |

TABLE 2-continued

|  | Preparative Example | | | |
|---|---|---|---|---|
|  | 11 | 12 | 13 | 14 |
| Solid content (%) | 45 | 45 | 45 | 45 |
| Viscosity (cP) | 2,400 | 2,550 | 2,600 | 2,900 |

Unit of content: part(s) by weight
EHA: 2-ethylhexyl acrylate
BA: butyl acrylate
HBA: 4-hydroxybutyl acrylate
HEA: 2-hydroxyethyl acrylate
PEGMA: polyethylene glycol monomethylether methacrylate (added ethylene oxide unit mole number: 9 moles)
DMAA: dimethylacrylamide Examples 1 to 10 and Comparative Examples 1 to 5

Tinuvin-144, Tinuvin-765, Irganox 1010, or Irganox 2450 was mixed with each of the acrylic copolymers prepared in Preparative Examples at ratios as listed in the following Tables 3 and 4, relative to 100 parts by weight of the acrylic copolymer. Each mixture was kept for 28 days in an oven whose temperature was set to 45° C., and the copolymers were observed for transparency, viscosity maintenance, and a change in solid content. After the copolymers were kept as described above, the transparencies of the copolymers were determined by observing the copolymers with the naked eye. In this case, when a copolymer is transparent, it is marked with "A," and when haze is observed due to the presence of crystalline foreign substances, it is marked with B." The measurement results of the respective acrylic copolymers are listed in the following Tables 5 and 6.

TABLE 3

|  | Example | | | | | | | | | |
|---|---|---|---|---|---|---|---|---|---|---|
|  | 1 | 2 | 3 | 4 | 5 | 6 | 7 | 8 | 9 | 10 |
| copolymer | A | A | A | C | E | F | K | L | L | M |
| HA1 | 0.5 | — | 0.2 | 2.0 | — | — | 1 | 0.5 | — | 2 |
| HA2 | — | 0.5 | — | — | 1.0 | 0.1 | — | — | 0.5 | — |
| AO1 | — | — | — | — | — | — | — | — | — | — |
| AO2 | — | — | — | — | — | — | — | — | — | — |

Unit of content: part(s) by weight, relative to 100 parts by weight of the copolymer
HA1: Tinuvin-144 (commercially available from BASF)
HA2: Tinuvin-765 (commercially available from BASF)
AO1: Irganox 1010 (commercially available from BASF)
AO2: Irganox 2450 (commercially available from BASF)

TABLE 4

|  | Comparative Example | | | | |
|---|---|---|---|---|---|
|  | 1 | 2 | 3 | 4 | 5 |
| copolymer | A | A | A | F | O |
| HA1 | — | — | — | — | 2 |
| HA2 | — | — | — | — | — |
| AO1 | 0.5 | 1.0 | — | 0.5 | — |
| AO2 | — | — | 1.0 | — | — |

Unit of content: part(s) by weight, relative to 100 parts by weight of the copolymer
HA1: Tinuvin-144 (commercially available from BASF)
HA2: Tinuvin-765 (commercially available from BASF)
AO1: Irganox 1010 (commercially available from BASF)
AO2: Irganox 2450 (commercially available from BASF)

TABLE 5

|  | Example | | | | | | | | | |
|---|---|---|---|---|---|---|---|---|---|---|
|  | 1 | 2 | 3 | 4 | 5 | 6 | 7 | 8 | 9 | 10 |
| Transparency | A | A | A | A | A | A | A | A | A | A |
| Viscosity maintenance | A | A | A | A | A | A | A | A | A | A |
| Maintenance of solid content | A | A | A | A | A | A | A | A | A | A |

Method of evaluation for viscosity maintenance: A: A change in viscosity relative to the initial viscosity is less than 15%; and B: A change in viscosity relative to the initial viscosity is greater than 15%
Method of evaluation for maintenance of solid content: A: A change in solid content relative to the initial solid content is less than 5%; and B: A change in solid content relative to the initial solid content is greater than 5%

TABLE 6

|  | Comparative Example | | | | |
|---|---|---|---|---|---|
|  | 1 | 2 | 3 | 4 | 5 |
| Transparency | B | B | B | B | A |
| Viscosity maintenance | B | A | A | A | B |
| Maintenance of solid content | A | A | A | A | A |

Method of evaluation for viscosity maintenance: A: A change in viscosity relative to the initial viscosity is less than 15%; and B: A change in viscosity relative to the initial viscosity is greater than 15%
Method of evaluation for maintenance of solid content: A: A change in solid content relative to the initial solid content is less than 5%; and B: A change in solid content relative to the initial solid content is greater than 5%

Example 11

Preparation of Pressure-Sensitive Adhesive Composition 0.5 parts by weight of Tinuvin-144 (commercially available from BASF) was mixed with 100 parts by weight of the acrylic polymer A prepared in Preparative Example 1, and 5.0 parts by weight of a mixture of an isophorone diisocyanate-based cross-linking agent and a hexamethylene diisocyanate-based cross-linking agent (MHG-80B commercially available from Asahi Kasei Chemicals Corp.) as a cross-linking agent, and 0.5 parts by weight of lithium bis(trifluoromethanesulfonyl)imide (LiTFSi) were also mixed homogeneously, relative to 100 parts by weight of the polymer A. In consideration of coatability, the resulting mixture was then diluted to a proper concentration to prepare a pressure-sensitive adhesive composition.

Preparation of Pressure-Sensitive Adhesive Sheet

One surface of a poly(ethylene terephthalate) (PET) film (thickness: 38 μm) was coated with the prepared pressure-sensitive adhesive composition, and dried to form a coating layer having a uniform thickness of approximately 20 μm. Thereafter, the coating layer was kept at approximately 90° C. for approximately 3 minutes to induce a cross-linking reaction on the coating layer, thereby preparing a pressure-sensitive adhesive sheet.

Examples 11 to 19 and Comparative Examples 6 to 11

Pressure-sensitive adhesive compositions were prepared in the same manner as in Example 11, except that the components and contents thereof in the pressure-sensitive adhesive compositions were altered, as listed in the following Table 7 or 8, and evaluated for physical properties. The evaluation results are also listed in the following Table 7 or 8.

TABLE 7

| | Example | | | | | | | | |
|---|---|---|---|---|---|---|---|---|---|
| | 11 | 12 | 13 | 14 | 15 | 16 | 17 | 18 | 19 |
| Copolymer | A | B | C | D | E | F | K | L | M |
| Cross-linking agent | 5.0 | 5.0 | 5.0 | 4.0 | 6.0 | 4.0 | 5 | 5 | 6 |
| AS1 | 0.3 | | 0.5 | 0.5 | | 1.0 | 0.5 | 0.5 | 0.5 |
| AS2 | | 2.0 | | | 1.0 | | | | |
| HA1 | 0.5 | | 0.5 | | 0.5 | | 0.5 | | |
| HA2 | | 0.5 | | 0.5 | | 0.5 | | | |
| AO1 | | | | | | | | | |
| AO2 | | | | | | | | | |
| L | 2.8 | 3.1 | 5.2 | 3.3 | 5.0 | 3.0 | 5.6 | 5.3 | 9 |
| H | 50 | 48 | 60 | 55 | 60 | 52 | 120 | 130 | 200 |
| H/L | 18 | 15 | 12 | 17 | 12 | 17 | 21 | 25 | 22 |
| ESD | 0.3 | 0.4 | 0.5 | 0.3 | 0.5 | 0.3 | 0.15 | 0.15 | 0.2 |
| Staining | A | A | A | A | A | A | A | A | A |

Unit of component content: part(s) by weight, relative to 100 parts by weight of the copolymer
Cross-linking agent: MHG-80B commercially available from Asahi Kasei Chemicals Corp.
AS1: lithium bis(trifluoromethanesulfonyl)imide
AS2: N-methyl-N,N,N-tributylammonium bis(trifluoromethanesulfonyl)imide
HA1: Tinuvin-144 (commercially available from BASF)
HA2: Tinuvin-765 (commercially available from BASF)
AO1: Irganox 1010 (commercially available from BASF)
AO2: Irganox 2450 (commercially available from BASF)

TABLE 8

| | Comparative Example | | | | | |
|---|---|---|---|---|---|---|
| | 6 | 7 | 8 | 9 | 10 | 11 |
| Copolymer | D | G | H | I | J | O |
| Cross-linking agent | 5.0 | 15.0 | 10.0 | 6.0 | 6.0 | 7 |
| AS1 | 10.0 | 1.0 | 0.5 | 1.0 | 0.5 | 0.5 |
| AS2 | | | | | | |
| HA1 | | | | | | |
| HA2 | | | | | | |
| AO1 | 0.5 | | 0.5 | 0.5 | | |
| AO2 | | 0.5 | | | 0.5 | 0.5 |
| L | 1.2 | 1.5 | 1.5 | 2.0 | 3.0 | 7 |
| H | 32 | 40 | 35 | 42 | 65 | 210 |
| H/L | >20 | >20 | >20 | >20 | >20 | |
| ESD | 0.5 | 0.5 | >1.0 | 0.4 | 0.3 | 0.45 |
| Staining | B | B | A | A | A | B |

Unit of component content: part(s) by weight, relative to 100 parts by weight of the copolymer
Cross-linking agent: MHG-80B commercially available from Asahi Kasei Chemicals Corp.
AS1: lithium bis(trifluoromethanesulfonyl)imide
AS2: N-methyl-N,N,N-tributylammonium bis(trifluoromethanesulfonyl)imide
HA1: Tinuvin-144 (commercially available from BASF)
HA2: Tinuvin-765 (commercially available from BASF)
AO1: Irganox 1010 (commercially available from BASF)
AO2: Irganox 2450 (commercially available from BASF)

What is claimed is:

1. A surface protective film comprising:
a base layer for surface protection; and
a pressure-sensitive adhesive layer on the base layer,
wherein the surface protective film is capable of being detachably attached on a surface to be protected,
wherein the pressure-sensitive adhesive layer comprises a pressure-sensitive adhesive composition in a cross-linked state, and the pressure-sensitive adhesive composition comprises:
a polymer; and
a compound represented by the Formula 3,
wherein the polymer consists of:
a polymerization unit of an alkyl (meth)acrylate;
a polymerization unit of a monomer represented by the Formula 1 and/or a monomer containing a nitrogen atom;
a polymerization unit of a first monomer, which is represented by the Formula 2 and in which the number of carbon atom of alkylene groups A and B of the Formula 2 is from 1 to 3; and
a polymerization unit of a second monomer, which is represented by the Formula 2 and in which the number of carbon atom of alkylene groups A and B of the Formula 2 is from 4 to 8,
wherein the ratio of the weight of the first monomer to the weight of the second monomer is in a range of about 2.5 to 25,
wherein the polymerization unit of the first monomer is in an amount at 1 to 25 parts by weight, and the polymerization unit of the second monomer is in an amount at 0.1 to 3 parts by weight,
wherein the alkyl (meth)acrylate consists of at least one selected from methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate or 2-ethylhexyl (meth)acrylate, and
wherein the pressure-sensitive adhesive composition in the cross-linked state has a low-speed peel strength measured at a peel angle of 180 degrees and a peel rate of 0.3 m/min with respect to an adherend having a surface energy of 30 mN/m or less in a range of about 1 to 40 gf/25mm, and has a high-speed peel strength measured at a peel angle of 180 degrees and a peel rate of 30 m/min with respect to an adherend having a surface energy of 30 mN/m or less in a range of about 10 to 150 gf/25mm,
wherein

[Formula 1]

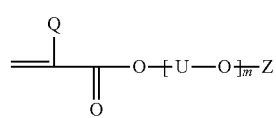

wherein Q of the Formula 1 represents hydrogen, or an alkyl group, U represents an alkylene group, Z represents hydrogen, an alkyl group, or an aryl group, m is a number ranging from 1 to 20;

wherein

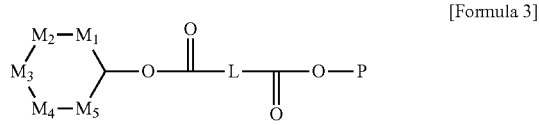
[Formula 3]

wherein $M_1$ to $M_5$ of Formula 3 are each independently $R^1$—N, $(R^2)$ $(R^3)$-C, or $(R^4)$ $(R^5)$—C where $R^1$ represents hydrogen, an alkyl group, or alkoxy group, $R^2$ and $R^3$ each independently represent an alkyl group, and $R^4$ and $R^5$ each independently represent hydrogen, or an alkyl group, L represents an alkylene group, or an alkylidene group, and P represents an alkyl group, or a substituent represented by the following Formula 4, provided that at least one of $M_2$ to $M_4$ in Formula 3 is $R^1$-N, and $M_1$, $M_2$, $M_3$, $M_4$ or $M_5$ present directly adjacent to $M_2$, $M_3$ or $M_4$ that is $R^1$—N is (R2)(R3)—C;

wherein

[Formula 4]

wherein $M_6$ to $M_{10}$ each independently represent $R^1$—N, $(R^2)(R^3)$—C, or $(R^4)(R^5)$—C where $R^1$ represents hydrogen, an alkyl group, or an alkoxy group, $R^2$ and $R^3$ each independently represent an alkyl group, and $R^4$ and $R^5$ each independently represent hydrogen, or an alkyl group, provided that at least one of $M_7$ to $M_9$ in Formula 4 is $R^1$—N, and $M_6$, $M_7$, $M_8$, $M_9$ or $M_{10}$ present directly adjacent to $M_7$, $M_8$ or $M_9$ that is $R^1$—N is $(R^2)(R^3)$—C; and wherein

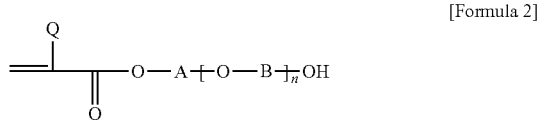
[Formula 2]

wherein Q of the Formula 2 represents hydrogen, A and B each independently represent an alkylene group, and n is a number ranging from 0 to 10.

2. The surface protective film of claim 1, wherein the monomer containing the nitrogen atom is a dialkyl (meth) acrylamide.

3. The surface protective film of claim 1, wherein the polymerization unit of the monomer of Formula 1, and the polymerization unit of the monomer containing the nitrogen atom are included in the polymer.

4. The surface protective film of claim 3, wherein the polymerization unit of the monomer of Formula 1 is in an amount at 0.1 to 7.0 parts by weight, and the polymerization unit of the monomer containing the nitrogen atom is in an amount at 1 to 30 parts by weight.

5. The surface protective film of claim 1, wherein $R^1$ in Formula 3 represents hydrogen, an alkyl group having 1 to 8 carbon atoms, or an alkoxy group having 4 to 16 carbon atoms, $R^2$ and $R^3$ each independently represent an alkyl group having 1 to 12 carbon atoms, and L represents an alkylene group having 4 to 12 carbon atoms, or an alkylidene group having 2 to 10 carbon atoms.

6. The surface protective film of claim 1, wherein the compound of Formula 3 is selected from bis(1,2,2,6,6-pentamethyl-4-piperidyl)sebacate, methyl 1,2,2,6,6-pentamethyl-4-piperidyl sebacate, propanedioic acid 2-[[3,5-bis(1,1-dimethylethyl)-4-hydroxyphenyl]methyl]-2-butyl-1,3-bis (1,2,2,6,6-pentamethyl-4-piperidinyl) ester, bis (2,2,6,6-tetramethyl-4-piperidyl)sebacate, or bis(1-octyloxy-2,2,6,6-tetramethyl-4-piperidinyl)sebacate.

7. The surface protective film of claim 1, wherein the compound of Formula 3 is comprised in the pressure-sensitive adhesive composition in an amount from 0.01 to 10 parts by weight, relative to 100 parts by weight of the polymer.

8. The surface protective film of claim 1, wherein the pressure-sensitive adhesive composition further comprises an aliphatic isocyanate cross-linking agent.

9. The surface protective film of claim 8, wherein the cross-linking agent comprises at least one selected from an aliphatic cyclic isocyanate compound, or an aliphatic non-cyclic isocyanate compound.

10. The surface protective film of claim 9, wherein the aliphatic cyclic isocyanate compound is an isocyanate compound selected from isophorone diisocyanate, methylene dicyclohexyl diisocyanate, cyclohexane diisocyanate, or a dimer or trimer of the isocyanate compound; or the aliphatic cyclic isocyanate compound is a reaction product of the isocyanate compound and a polyol.

11. The surface protective film of claim 9, wherein the aliphatic non-cyclic isocyanate compound is at least one selected from an alkylene diisocyanate compound having 1 to 20 carbon atoms; a dimer or trimer of the isocyanate compound; or a reaction product of the isocyanate compound and a polyol.

12. The surface protective film of claim 8, wherein the cross-linking agent is comprised in the pressure-sensitive adhesive composition at a content of 0.01 parts by weight to 10 parts by weight, relative to 100 parts by weight of the polymer.

13. The surface protective film of claim 1, wherein the pressure-sensitive adhesive composition further comprises an ionic compound.

14. An optical element having a surface and having the surface protective film of claim 1 detachably attached on the surface,
wherein the surface energy of the surface on which the protective film is attached is less than or equal to 30 mN/m, and
wherein the surface protective film is directly attached to the surface having the surface energy of less than or equal to 30 mN/m.

15. A display device comprising the optical element defined in claim 14.

* * * * *